Patented Aug. 15, 1950

2,518,476

UNITED STATES PATENT OFFICE 2,518,476

CYANINE DYESTUFFS

John David Kendall and Frank Peter Doyle, Ilford, England, assignors to Ilford Limited, Ilford, England, a British company No Drawing. Application June 3, 1948, Serial No. 30,978. In Great Britain June 4, 1947

9 Claims. (Cl. 260—240.1)

1

This invention relates to cyanine dyestuffs.

In co-pending application Serial No. 30,977 dyestuff intermediates are prepared by reacting a cyanine dye of the general Formula I:

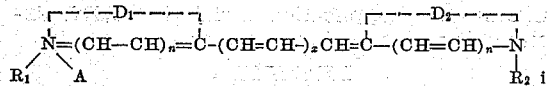

(this being one of the resonance extremes) wherein $R_1$ and $R_2$ are the same or different and are alkyl, hydroxyalkyl, aralkyl or hydroxyaralkyl groups, $D_1$ and $D_2$ are the same or different and are residues of five-membered or six-membered heterocyclic nitrogen rings, $n$ is nought or one, $x$ is 1 or 2, and A is an acid radicle, with an acid HX where X is the acid radicle and a trithio-orthoformate of the formula $HC(SR_3)_3$ where $R_3$ is an alkyl or aralkyl group, the reaction being effected in the presence of a carboxylic acid or anhydride which is a solvent for the reacting materials.

The product of the reaction is believed to be a compound of the general Formula II:

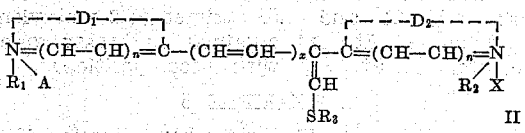

or the isomer in which the =CH—$SR_3$ grouping is attached to the carbon atom of the chain which is adjacent the ring of which $D_1$ is a residue. Normally only one isomer appears to be formed. Where $D_1$ and $D_2$ are the same, the isomers will be identical. The precise location of the quaternising groups in the final product is indeterminate; they may be $R_1$ A and $R_2$ X as shown or they may be $R_2$ A and $R_1$ X. Moreover, the anion X may replace A if the RX salts are much less soluble. Where $R_1$ or $R_2$ contains an hydroxy group this may be acylated under the conditions of the reaction and to that extent the character of $R_1$ and $R_2$ may differ in the product from their character in the original compound.

The groups $R_1$ and $R_2$ are preferably lower alkyl or hydroxyalkyl groups, e. g. methyl, ethyl or propyl groups, or the corresponding hydroxyalkyl groups, e. g. β-hydroxyethyl.

Since in most cases where the product is used for further condensations, such condensations will result in the removal of the $SR_3$ group, the nature of $R_3$ is not of special importance. For the sake of convenience, however, it may be ethyl, in which case the reagent employed is triethyl trithioorthoformate which is the most readily obtainable compound of the series. However, it may be any other alkyl group or aralkyl group, e. g. tribenzyl trithio-orthoformate.

2

The acid HX may be any strong acid, but the hydrohalic acids, e. g. HCl and HBr, and p-toluene sulphonic acid are preferred. The solvent acid or anhydride is preferably a weak acid, e. g. acetic acid or acetic anhydride.

The reaction should be effected under substantially anhydrous conditions, i. e. in the absence of any hydrolytic substance, and is best effected by heating the reagents together.

The residues $D_1$ and $D_2$ may be selected from the residues of thiazoles, oxazoles, selenazoles and their polycyclic homologues, such as those of the benzene, naphthalene, acenaphthene and anthracene series, pyridine and its polycyclic homologues, such as quinoline and α and β naphthaquinolines, lepidines, indolenines, diazines, such as pyrimidines and quinazolines, diazoles (e. g. thio-β.β'-diazole), oxazolines, thiazolines and selenazolines. The polycyclic compounds of this series may also be substituted in the carbocyclic rings with one or more groups such as alkyl, aryl, amino, hydroxy, alkoxy and methylene-dioxy groups, or by halogen atoms.

According to the present invention trinuclear polymethine dyestuffs are obtained by reacting a compound of general Formula II with a heterocyclic nitrogen compound containing a reactive methylene group. Such compounds may be (a) compounds of the general Formula III:

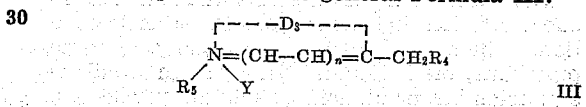

where $D_3$ is the residue of a five-membered or six-membered heterocyclic nitrogen compound, $R_4$ is a hydrogen atom or a hydrocarbon group, $R_5$ is an alkyl or aralkyl, hydroxyalkyl or hydroxyaralkyl group and Y is an acid radicle, and the corresponding methylene bases of the general Formula IV:

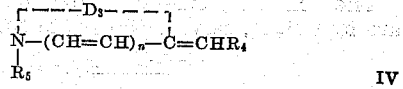

(b) compounds of the general Formula V:

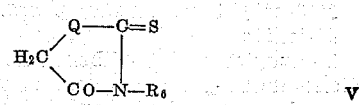

where Q is an oxygen atom or a sulphur atom and $R_6$ is a hydrogen atom or a hydrocarbon group.

Though some of the products obtained where $x$ is one have been made by other methods, it is believed that the present invention provides for the first time a method of making those products in which $x$ is two. Such novel products have the following general Formulae VI and VII:

Using intermediates of type (a)

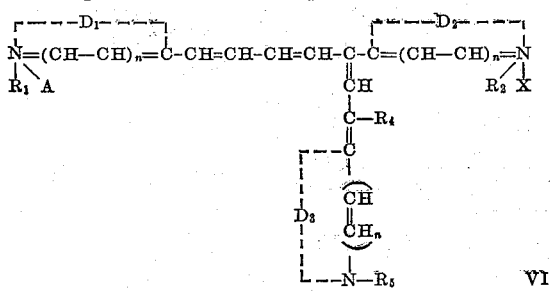

Using intermediates of type (b)

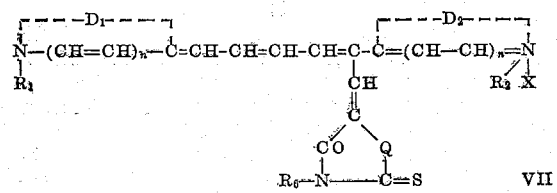

Compounds of type (a) which may be employed may be any of those which have been used or proposed for use in the many processes for the production of cyanine and similar dyestuffs, for example, thiazoles, oxazoles, selenazoles and their polycyclic homologues such as those of the benzene, naphthalene, acenaphthene and anthracene series; pyridine and its polycyclic homologues such as quinoline and $\alpha$ and $\beta$ naphthaquinolines; lepidines; indolenines; diazines, such as pyrimidines and quinazolines; diazoles (e. g. thio-$\beta\beta'$-diazole); oxazolines, thiazolines and selenazolines. The polycyclic compounds of these series may also be substituted in the carbocyclic rings with one or more groups such as alkyl, aryl, amino, hydroxy, alkoxy and methylene-dioxy groups, or by halogen atoms.

Compounds of type (b) which may be employed are rhodanic acid and oxarhodanic acid and the N-hydrocarbon substitution derivatives of these compounds.

The formation of the dyestuffs is readily effected by heating the reagents together in solution. The solvent may be a base, e. g. pyridine, piperidine, diethylamine, triethylamine and triethanolamine, or an acid or acid anhydride, e. g. acetic acid and acetic anhydride.

Where the dyestuff is obtained in the form of a sulphate or an alkyl-p-toluene sulphonate, it may be converted to a salt of another acid by treatment with a solution of an alkali salt of such other acid, e. g. potassium chloride, potassium bromide or potassium iodide.

The following examples, in which the parts are by weight, serve to illustrate this invention:

EXAMPLE 1

*Preparation of bis-2-(3-ethyl benzthiazole)-γ-2'(3-ethyl benzthiazole) pentamethine cyanine di-iodide*

1 - ethylthio - 2.4 - dibenzthiazolyl - .1:3-butadiene-dietho-p-toluene sulphonate (prepared as an oil from 33' diethyl thiacarbocyanine p-toluene sulphonate 2.7 parts, see application Serial No. 30,977, Example 3) and 2-methyl benzthiazole ethiodide (1.5 parts) were heated in anhydrous pyridine (20 cc.) for ten minutes. The blue solution was poured into aqueous potassium iodide solution, diluted with water and cooled. The washed dyestuff was recrystallised from methyl alcohol to give tiny green needles, M. Pt. 247° (with decomposition) of the dye of the formula:

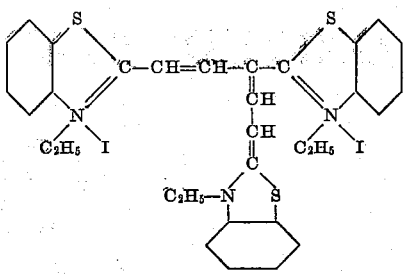

EXAMPLE 2

*Preparation of 2-(3-ethyl benzthiazole)-2'-(1-ethyl quinoline)-γ.2'''(3-ethyl benzthiazole) pentamethine cyanine di-iodide*

This was prepared as green needles, M. Pt. 236° (with decomposition) by the general method of Example 1 by the reaction of the dyestuff intermediate (application Serial No. 30,977, Example 4) with quinaldine ethiodide.

EXAMPLE 3

*Preparation of 2 - (3 - ethyl-benzthiazole)-2'-(3-ethyl - benzoxazole) - γ.2''' - (3 - ethyl - benzthiazole) pentamethine cyanine di-iodide*

Prepared as in Example 1, but using the dyestuff intermediate of application Serial No. 30,977, Example 5 and 2-methyl benzoxazole ethiodide. It was obtained as green crystals, M. Pt. 190° with decomposition).

EXAMPLE 4

*Preparation of 2-(3-ethyl-benzthiazole)-2'(133-trimethyl - indolenine)γ.2''' - (3 - ethyl - benzthiazole) pentamethine cyanine di-iodide*

Prepared as in Example 1 using the dyestuff intermediate of application Serial No. 30,977, Example 21 and 1.33 trimethyl-2-methylene indolenine. It was obtained as brassy green crystals, M. Pt. 184° (with discomposition).

EXAMPLE 5

*Preparation of [2(3-ethyl-benzthiazole)-5'(3-ethyl - 2 - thio - 4 - keto - tetrahydrothiazole) - γ.2'''(3-ethyl-benzthiazole) tetramethine merocyanine] iodide*

Prepared as in Example 1 using the dyestuff intermediate of application Serial No. 30,977, Example 3 and 3-ethyl-2-thio-4-keto tetrahydrothiazole. It was obtained as tiny green crystals, M. Pt. 246° (with decomposition) having the formula:

EXAMPLE 6

*Preparation of [2(3 - ethyl - benzthiazole) - 5'(3-methyl - 2 - thio - 4 - keto - tetrahydrothiazole)-γ.2'''-(3-ethyl-benzthiazole) tetramethine merocyanine] iodide*

Prepared as in Example 1 using the dyestuff

EXAMPLE 7

Preparation of [2-(3-ethyl-benzthiazole)-4'-(1-phenyl - 3 - methyl - 5 - pyrazolone) - γ.2''(3-ethyl-benzthiazole) tetramethine merocyanine] iodide Prepared as in Example 1 using the dyestuff intermediate of application Serial No. 30,977, Example 3 and 1-phenyl-3-methyl-5-pyrazolone. It was obtained as green crystals, M. Pt. 194° (with decomposition).

EXAMPLE 8

Preparation of bis-2-(-3-ethyl-5-methyl-benzthiazole) - γ.2'-(3 - ethyl-5-methyl-benzthiazole) pentamethine cyanine di-iodide Prepared as in Example 1 using the dyestuff intermediate of application Serial No. 30,977, Example 6 and 2.5-dimethyl benzthiazole ethiodide. It was obtained as green crystals, M. Pt. 248° (with decomposition).

EXAMPLE 9

Preparation of 2-(3-ethyl-5-methyl-benzthiazole) - 2' - (133 - trimethyl indolenine - γ.2''-(3-ethyl-5-methyl benzthiazole) pentamethine cyanine di-iodide This was prepared from the dystuff intermediate of application Serial No. 30,977, Example 6 by reaction with 133-trimethyl-2-methylene dihydro indolenine in acetic anhydride solution. It was isolated as in Example 1 as green crystals, M. Pt. 192° (with decomposition).

EXAMPLE 10

Preparation of [2-(3-ethyl-5-methyl-benzthiazole) - 5' - (3 - methyl - 2 - thio - 4 - keto - tetrahydrothiazole) - γ.2'' - 3 - ethyl - 5 - methyl-benzthiazole tetramethine merocyanine] iodide Prepared as in Example 1 using the dyestuff intermediate of application Serial No. 30,977, Example 6 and 3-methyl-2-thio-4-keto-tetrahydrothiazole. It was obtained as golden crystals, M. Pt. 212° (with decomposition).

EXAMPLE 11

Preparation of [2-(3-ethyl-5-methyl-benzthiazole) - 5' - (3 - ethyl - 2 - thio - 4 - keto - tetrahydrothiazole) - γ.2'' - (3 - ethyl - 5 - methyl-benzthiazole) tetramethine merocyanine] iodide Prepared as in Example 1 using the dyestuff intermediate of application Serial No. 30,977, Example 6 and 3-ethyl-2-thio-4-keto-tetrahydrothiazole. It was obtained as glittering blue-green crystals, M. Pt. 210° (with decomposition).

EXAMPLE 12

Preparation of [2-(3-ethyl-5-methyl-benzthiazole) - 4' - (1 - phenyl - 3 - methyl - 5 - pyrazolone) - γ.2'' - (3 - ethyl - 5 - methyl - benzthiazole) tetramethine merocyanine] iodide Prepared as in Example 1 using the dyestuff intermediate of application Serial No. 30,977, Example 6 and 1-phenyl-3-methyl-5-pyrazolone. It was obtained as brown-green crystals, M. Pt. 258° (with decomposition).

EXAMPLE 13

Preparation of bis-2-(3-ethyl-5-chloro-benzthiazole) - γ.2' - (3 - ethyl - 5 - chloro - benzthiazole) pentamethine cyanine di-iodide Prepared as in Example 1 using the dyestuff intermediate of application Serial No. 30,977, Example 8 and 2-methyl-5-chloro-benzthiazole ethiodide. It was obtained after crystallisation from a mixture of pyridine and methyl alcohol as golden crystals, M. Pt. 260° (with decomposition).

EXAMPLE 14

Preparation of [2-(3-ethyl-5-chloro-benzthiazole) - 5'(3 - methyl - 2 - thio - 4 - keto - tetrahydrothiazole) - γ.2'' - (3 - ethyl - 5 - chloro-benzthiazole) tetramethine merocyanine] iodide Prepared as in Example 1 using the dyestuff intermediate of application Serial No. 30,977, Example 8 and 3-methyl-2-thio-4-keto-tetrahydrothiazole. It was obtained after crystallisation from pyridine as dark green crystals, M. Pt. 210° (with decomposition).

EXAMPLE 15

Preparation of [2-(3-ethyl-5-chloro-benzthiazole) - 5' - (3 - ethyl - 2 - thio - 4 - keto - tetrahydrothiazole) - γ.2'' - (3 - ethyl - 5 - chlorobenzthiazole) tetramethine merocyanine] p-toluene sulphonate Prepared as in Example 1 using the dyestuff intermediate of application Serial No. 30,977, Example 8 and 3-ethyl-2-thio-4-keto-tetrahydrothiazole. The dyestuff was isolated as the p-toluene sulphonate and was crystallised from methyl alcohol to give yellow-green crystals, M. Pt. 236° (with decomposition).

EXAMPLE 16

Preparation of [2(3 - ethyl-5-chloro - benzthiazole) - 4' - (1 - phenyl - 3 - methyl - 5 - pyrazolone) - γ.2''(3 - ethyl - 5 - chloro - benzthiazole) tetramethine merocyanine] iodide Prepared as in Example 1 using the dyestuff intermediate of application Serial No. 30,977, Example 8 and 1-phenyl-3-methyl-5-pyrazolone. It was obtained as brassy-green crystals, M. Pt. 258° (with decomposition, after recrystallisation from a mixture of pyridine and methyl alcohol).

EXAMPLE 17

Preparation of [ 2-(3 - ethyl - 4.5 - benzbenzthiazole) - 5' - (3 - ethyl - 2 - thio - 4 - keto - tetrahydrothiazole) - γ - 2''(3 - ethyl - 4.5 - benzbenzthiazole) tetramethine merocyanine] iodide Prepared as in Example 1 using the dyestuff intermediate of application Serial No. 30,977, Example 10 and 3-ethyl-2-thio-4-keto-tetrahydrothiazole. It was obtained after crystallisation from pyridine as magenta crystals, M. Pt. 283° (with decomposition).

EXAMPLE 18

Preparation of [2 -(3 - ethyl - 4.5 - benzbenzthiazole) - 5' - (3 - methyl - 2 - thio - 4 - keto - tetrahydrothiazole) - γ.2'' - (3 - ethyl - 4.5 - benzbenzthiazole) tetramethine merocyanine]-p-toluene sulphonate Prepared as in Example 1 using the dyestuff intermediate of application Serial No. 30,977, Example 10 and 3-methyl-2-thio-4-keto-tetrahydrothiazole. The dyestuff was isolated as the p-toluene sulphonate and crystallised from a mixture of pyridine and methyl alcohol to give blue-green crystals, M. Pt. 241° (with decomposition) having the formula:

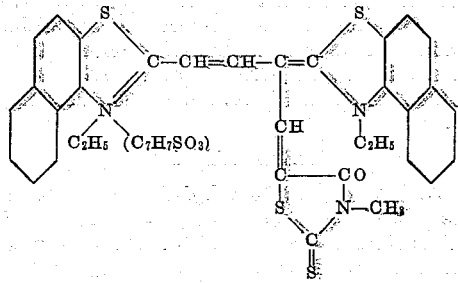

EXAMPLE 19

*Preparation of [2-(3-ethyl-4,5-benzbenzthiazole)-4'-(1-phenyl-3-methyl-5-pyrazolone)-γ,2''(3-ethyl-4,5-benzbenzthiazole) tetramethine merocyanine] p-toluene sulphonate*

Prepared as in Example 1 using the dyestuff intermediate of application Serial No. 30,977, Example 10 and 1-phenyl-3-methyl-5-pyrazolone. It was obtained as green crystals, M. Pt. 212° (with decomposition) having the formula:

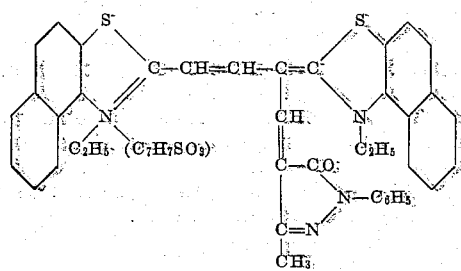

EXAMPLE 20

*Preparation of bis-2-(1-ethyl quinoline)-γ,2''-(1-ethyl quinoline) pentamethine cyanine di-iodide*

Prepared as in Example 1 using the dyestuff intermediate of application Serial No. 30,977, Example 1 and quinaldine ethiodide. It was obtained as yellow-green crystals, M. Pt. 236° (with decomposition).

EXAMPLE 21

*Preparation of [2-(1-ethyl quinoline)-5'-(3-ethyl-2-thio-4-keto-tetrahydrothiazole)-γ,2''(1-ethyl quinoline) tetramethine merocyanine] iodide*

Prepared as in Example 1 using the dyestuff intermediate of application Serial No. 30,977, Example 14 and 3-ethyl-2-thio-4-keto-tetrahydrothiazole. The dyestuff was obtained as dark green crystals, M. Pt. 204° (with decomposition).

EXAMPLE 22

*Preparation of [2-(1-ethyl quinoline)-5''(3-methyl-2-thio-4-keto-tetrahydrothiazole)-γ,2''-(1-ethyl quinoline) tetramethine merocyanine] bromide*

Prepared as in Example 1 using the dyestuff intermediate of application Serial No. 30,977, Example 14 and 3-methyl-2-thio-4-keto-tetrahydrothiazole. The dyestuff was isolated as the bromide, as light green crystals, M. Pt. 210° (with decomposition).

EXAMPLE 23

*Preparation of [2-(1-ethyl quinoline)-4'-(1-phenyl-3-methyl-5-pyrazolone)-γ,2''(1-ethyl quinoline) tetramethine merocyanine] iodide*

Prepared as in Example 1 using the dyestuff intermediate of application Serial No. 30,977, Example 13 and 1-phenyl-3-methyl-5-pyrazolone. It was obtained as a green powder, M. Pt. 260° (with decomposition) having the formula:

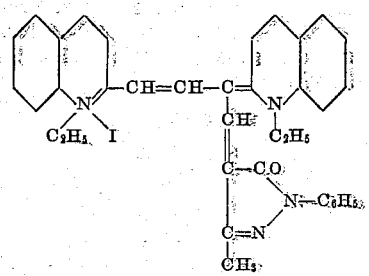

EXAMPLE 24

*Preparation of [2-(1-ethyl quinoline)-5'-(3-ethyl-2-thio-4-keto-tetrahydro-oxazole)-γ,2''-(1-ethyl quinoline) tetramethine merocyanine] iodide*

Prepared as in Example 1 using the dyestuff intermediate of application Serial No. 30,977, Example 13 and 3-ethyl-2-thio-4-keto-tetrahydro-oxazole. It was obtained as light green crystals, M. Pt. 248° (with decomposition).

EXAMPLE 25

*Preparation of bis-2(3-ethyl-benzselenazole)-γ,2'(3-ethyl-benzselenazole) pentamethine cyanine mono-ethiodide mono-p-toluene sulphonate*

Prepared as in Example 1 using the dyestuff intermediate of application Serial No. 30,977, Example 17 and 2-methyl benzselenazole ethiodide. The dyestuff was deposited from the pyridine solution during the heating period. It was filtered and crystallised to give bright green crystals, M. Pt. 245° (with decomposition) having the formula:

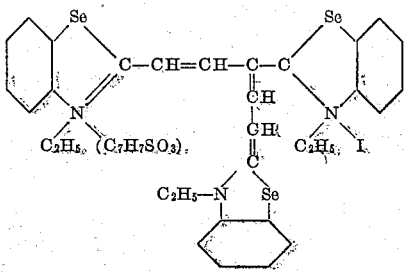

EXAMPLE 26

*Preparation of [2-(3-ethyl-benzselenazole)-5'-(3-ethyl-2-thio-4-keto-tetrahydrothiazole-γ,2''-(3-ethyl-benzselenazole) tetramethine merocyanine] iodide*

Prepared as in Example 1 using the dyestuff intermediate of application Serial No. 30,977, Example 17 and 3-ethyl-2-thio-4-keto-tetrahydrothiazole. It was obtained as brown crystals, M. Pt. 244° (with decomposition) after crystallisation from a mixture of methyl alcohol and pyridine.

EXAMPLE 27

*Preparation of [2-(3-ethyl-benzselenazole)-5'-(3-methyl-2-thio-4-keto-tetrahydrothiazole)-γ.2''(3-ethyl-benzselenazole) tetramethine merocyanine] iodide*

Prepared as in Example 1 using the dyestuff intermediate of application Serial No. 30,977, Example 17 and 3-methyl-2-thio-4-keto-tetrahydrothiazole. It was obtained as brassy-green crystals, M. Pt. 235° (with decomposition) having the formula:

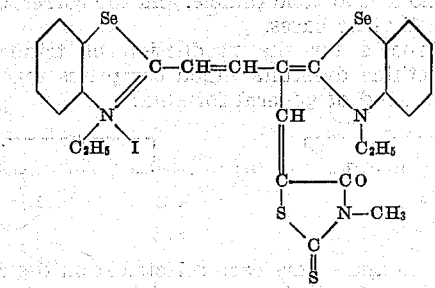

EXAMPLE 28

*Preparation of [2-(3-ethyl-benzselenazole)-4'-(1-phenyl-3-methyl-5-pyrazolone)-γ.2''-(3-ethyl-benzselenazole) tetramethine merocyanine] iodide*

Prepared as in Example 1 using the dyestuff intermediate of application Serial No. 30,977, Example 17 and 1-phenyl-3-methyl-5-pyrazolone. It was obtained as shiny green crystals, M. Pt. 193° (with decomposition).

EXAMPLE 29

*Preparation of bis-2-(133-trimethyl indolenine)-γ.2'(1.3.3-trimethyl-indolenine)-heptamethine cyanine di-iodide*

The dyestuff intermediate of application Serial No. 30,977, Example 18 (prepared from bis-2-(133-trimethyl indolenine) pentamethine cyanine iodide (13 parts)) was heated with 2.3.3-trimethyl indolenine methiodide (7.5 parts) in acetic anhydride solution (400 parts) for five minutes. The solution was then cooled and diluted with ether to precipitate the dyestuff as a tar. This, on treatment with acetone, gave a solid which was crystallised from methyl alcohol to give brown crystals with a red reflex, M. Pt. 238° (with decomposition).

EXAMPLE 30

*Preparation of 2(3-ethyl-benzthiazole)-2'-(133-trimethyl indolenine)-γ.2''-(133-trimethyl indolenine) heptamethine cyanine di-iodide*

The dyestuff intermediate of application Serial No. 30,977, Example 18 was reacted with 2-methyl-benzthiazole-ethiodide as in Example 29 to give the dyestuff as dark brown crystals (from a mixture of methyl alcohol and pyridine), M. Pt. 214° (with decomposition) and having the formula:

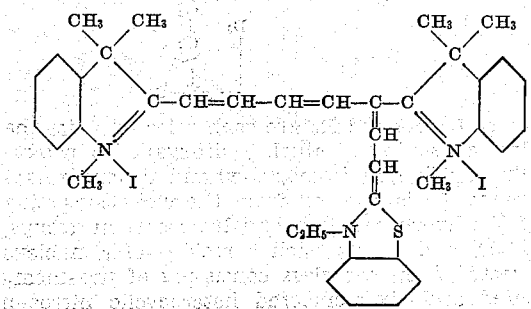

EXAMPLE 31

*Preparation of 2(1-ethyl quinoline)-2'-(133-trimethyl indolenine)-γ.2''-(133-trimethyl indolenine) heptamethine cyanine di-iodide*

The dyestuff intermediate of application Serial No. 30,977, Example 18 was reacted with quinaldine ethiodide as in Example 29 to give dark blue crystals from a mixture of methyl alcohol and pyridine, M. Pt. 213° (with decomposition).

EXAMPLE 32

*Preparation of [5(3-methyl-2-thio-4-keto-tetrahydrothiazole)-2-(1.3.3.trimethyl indolenine)-β-2''(1.3.3.trimethyl indolenine) hexamethine merocyanine] iodide*

The dyestuff intermediate of application Serial No. 30,977, Example 18 was reacted with 3-methyl-2-thio-4-keto-tetrahydrothiazole as in Example 29, heating being maintained for 30 minutes. The dyestuff was obtained as royal blue crystals, M. Pt. 209° (with decomposition).

EXAMPLE 33

*Preparation of bis-2-(3-ethyl-5-methyl-benzthiazole)-γ.2'-(3-ethyl-5-methyl-benzthiazole) heptamethine cyanine di-iodide*

Prepared as in Example 29 using the dyestuff intermediate of application Serial No. 30,977, Example 19 and 1.6-dimethyl benzthiazole ethiodide. The dyestuff was isolated by pouring the acetic anhydride solution into hot water. It was obtained after crystallisation from a mixture of methyl alcohol and pyridine as dark blue crystals, M. Pt. 213° (with decomposition).

EXAMPLE 34

*Preparation of 2-(1-ethyl quinoline)-2'-(3-ethyl-5-methyl-benzthiazole)-γ.2''-(3-ethyl-5-methyl-benzthiazole) heptamethine cyanine di-iodide*

Prepared as in Example 29 using the dyestuff intermediate of application Serial No. 30,977, Example 19 and quinaldine ethiodide. The dyestuff was isolated as in Example 33 to give green crystals with a gold reflex, M. Pt. 225° (with decomposition).

EXAMPLE 35

*Preparation of 2-(1.3.3-trimethyl indolenine)-2'-(3-ethyl-5-methyl benzthiazole)-γ.2''-(3-ethyl-5-methyl benzthiazole) heptamethine cyanine di-iodide*

Prepared as in Example 29 using the dyestuff intermediate of application Serial No. 30,977, Example 19 and 2.3.3.trimethyl indolenine methiodide. The dyestuff was isolated as in Example 33 to give dark green matted crystals, M. Pt. 310° (with decomposition).

EXAMPLE 36

*Preparation of 2-(3-ethyl benzoxazole)-2'-(3-ethyl-5-methyl-benzthiazole)-γ.2''- (3-ethyl-5-methyl-benzthiazole) heptamethine cyanine di-iodide*

Prepared as in Example 29 using the dyestuff intermediate of application Serial No. 30,977, Example 19 and 2-methyl benzoxazole ethiodide. The dyestuff was isolated as in Example 33 to give small green crystals, M. Pt. 222° (with decomposition).

EXAMPLE 37

*Preparation of bis-2(3-ethyl-5-chloro-benzthiazole)-γ.2'-(3-ethyl-5-chloro-benzthiazole) heptamethine cyanine di-iodide*

Prepared as in Example 29 using the dyestuff intermediate of application Serial No. 30,977, Example 20 and 2-methyl-5-chloro-benzthiazole ethiodide. The dyestuff was isolated as in Example 33 to give green matted crystals, M. Pt. 238° (with decomposition).

EXAMPLE 38

*Preparation of 2-(1-ethyl-quinoline)-2'-(3-ethyl-5-chloro-benzthiazole)-γ.2''-(3-ethyl-5-chloro-benzthiazole) heptamethine cyanine di-iodide*

Prepared as in Example 29 using the dyestuff intermediate of application Serial No. 30,977, Example 20 and quinaldine ethiodide. The dyestuff was isolated as in Example 33 to give small dark green crystals, M. Pt. 225° (with decomposition).

EXAMPLE 39

*Preparation of 2-(1.3.3-trimethyl indolenine)-2'-(3-ethyl-5-chloro-benzthiazole)-γ.2''-(3-ethyl-5-chloro-benzthiazole) heptamethine cyanine di-iodide*

Prepared as in Example 29 using the dyestuff intermediate of application Serial No. 30,977, Example 20 and 2.3.3-trimethyl-indolenine-methiodide. The dyestuff was isolated as in Example 33 to give light blue matted crystals, M. Pt. 214° (with decomposition).

What we claim is:

1. Process for the production of trinuclear polymethine dyestuffs which comprises reacting a compound of general formula:

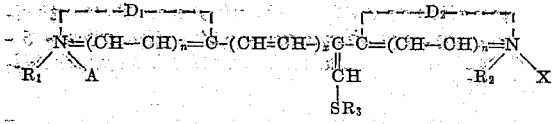

where $R_1$ and $R_2$ are each selected from the class consisting of alkyl, hydroxyalkyl, acyloxyalkyl, aralkyl, hydroxyaralkyl and acyloxyaralkyl groups, $R_3$ is selected from the class consisting of alkyl and aralkyl groups, $D_1$ and $D_2$ are each a residue of a nucleus selected from the class consisting of five-membered and six-membered heterocyclic nitrogen nuclei, $n$ is selected from nought and one, $x$ is selected from one and two and A and X are acid radicles, with a heterocyclic compound containing a reactive methylene group.

2. Process for the production of trinuclear polymethine dyestuffs which comprises reacting a compound of general formula:

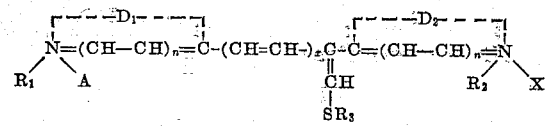

where $R_1$ and $R_2$ are each selected from the class consisting of alkyl, hydroxyalkyl, acyloxyalkyl, aralkyl, hydroxyaralkyl and acyloxyaralkyl groups, $R_3$ is selected from the class consisting of alkyl and aralkyl groups, $D_1$ and $D_2$ are each a residue of a nucleus selected from the class consisting of five-membered and six-membered heterocyclic nitrogen nuclei, $n$ is selected from nought and one, $x$ is selected from one and two and A and X are acid radicles, with a compound selected from the class consisting of quaternary salts of the general formula:

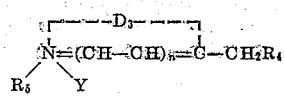

where $D_3$ is the residue of a nucleus selected from the same class as $D_1$ and $D_2$, $R_4$ is selected from the class consisting of the hydrogen atom and hydrocarbon groups, $R_5$ is selected from the same class as $R_1$ and $R_2$, $n$ is selected from nought and one and Y is an acid radical, and the corresponding methylene bases.

3. Process for the production of trinuclear polymethine dyestuffs which comprises reacting a compound of general formula:

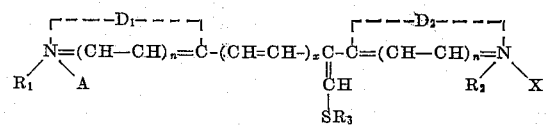

where $R_1$ and $R_2$ are each selected from the class consisting of alkyl, hydroxyalkyl, acyloxyalkyl, aralkyl, hydroxyaralkyl and acyloxyaralkyl groups, $R_3$ is selected from the class consisting of alkyl and aralkyl groups, $D_1$ and $D_2$ are each a residue of a nucleus selected from the class consisting of five-membered and six-membered heterocyclic nitrogen nuclei, $n$ is selected from nought and one, $x$ is selected from one and two and A and X are acid radicles, with a compound of the general formula:

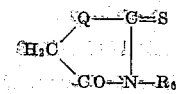

where Q is selected from the class consisting of the oxygen atom and the sulphur atom and $R_6$ is selected from the class consisting of the hydrogen atom and hydrocarbon groups.

4. Process according to claim 1 wherein the reaction is effected by heating the reagents in the presence of a base.

5. Process according to claim 1 wherein the reaction is effected by heating the reagents in the presence of a carboxylic acid anhydride.

6. Process according to claim 4 wherein the reaction is effected by heating the reagents in the presence of a base.

7. Process according to claim 5 wherein the reaction is effected by heating the reagents in the presence of a base.

8. A dyestuff of the general formula:

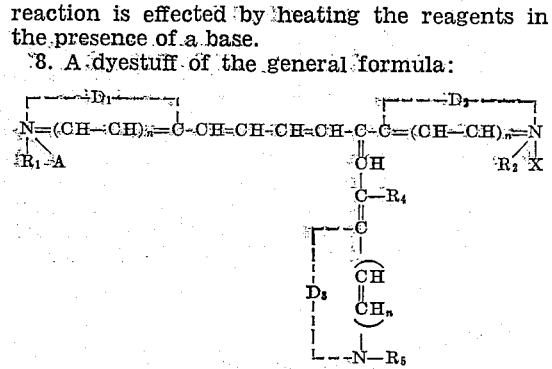

where $R_1$, $R_2$ and $R_5$ are each selected from the class consisting of alkyl, hydroxyalkyl, acyloxyalkyl, aralkyl, hydroxyaralkyl and acyloxyaralkyl groups, $R_4$ is selected from the class consisting of the hydrogen atom and hydrocarbon groups, $D_1$, $D_2$ and $D_3$ are each a residue of a nucleus selected from the class consisting of five-membered and six-membered heterocyclic nitrogen nuclei, $n$ is selected from nought and one and A and X are acid radicles.
9. A dye of the formula:
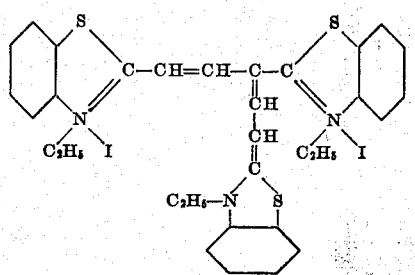
JOHN DAVID KENDALL.
FRANK PETER DOYLE.
REFERENCES CITED
The following references are of record in the file of this patent:
UNITED STATES PATENTS
| Number | Name | Date |
|---|---|---|
| 2,385,815 | Kendall | Oct. 2, 1945 |
FOREIGN PATENTS
| Number | Country | Date |
|---|---|---|
| 549,202 | Great Britain | Nov. 11, 1942 |